(12) United States Patent
Lynk et al.

(10) Patent No.: US 11,552,310 B2
(45) Date of Patent: Jan. 10, 2023

(54) COOLING SYSTEM FOR FUEL CELL STACKS

(71) Applicants: NIKOLA CORPORATION, Phoenix, AZ (US); ROBERT BOSCH GMBH, Stuttgart-Feuerbach (DE)

(72) Inventors: Kevin Lynk, Phoenix, AZ (US); Jesse Schneider, Chandler, AZ (US); Werner Belschner, Michelbach an der Bilz (DE); Jorg Heyse, Besigheim (DE); Markus Remlinger, Miesbach (DE)

(73) Assignees: Nikola Corporation, Phoenix, AZ (US); Robert Bosch GmbH, Stuttgart-Feuerbach (DE)

( * ) Notice: Subject to any disclaimer, the term of this patent is extended or adjusted under 35 U.S.C. 154(b) by 0 days.

(21) Appl. No.: 17/472,067

(22) Filed: Sep. 10, 2021

(65) Prior Publication Data
US 2021/0408562 A1 Dec. 30, 2021

Related U.S. Application Data

(63) Continuation of application No. 16/917,404, filed on Jun. 30, 2020, now Pat. No. 11,217,799, which is a continuation of application No. PCT/IB2019/057252, filed on Aug. 28, 2019.

(30) Foreign Application Priority Data

Aug. 29, 2018 (DE) .................. 10 2018214640.3

(51) Int. Cl.
*H01M 8/04* (2016.01)
*H01M 8/04029* (2016.01)
*H01M 8/04225* (2016.01)
*H01M 8/04007* (2016.01)
*H01M 8/04223* (2016.01)
*H01M 8/249* (2016.01)

(52) U.S. Cl.
CPC ... *H01M 8/04029* (2013.01); *H01M 8/04037* (2013.01); *H01M 8/04225* (2016.02); *H01M 8/04268* (2013.01); *H01M 8/249* (2013.01); *H01M 2250/20* (2013.01)

(58) Field of Classification Search
CPC ......... H01M 8/04029; H01M 8/04225; H01M 8/04037; H01M 8/04268; H01M 8/249
See application file for complete search history.

(56) References Cited

U.S. PATENT DOCUMENTS

2003/0118883 A1* 6/2003 Breault ............. H01M 8/04225
429/429
2004/0185313 A1* 9/2004 Halter ................... H01M 8/186
429/418

(Continued)

*Primary Examiner* — Olatunji A Godo
(74) *Attorney, Agent, or Firm* — Snell & Wilmer L.L.P.

(57) ABSTRACT

The invention relates to a cooling system (10) for fuel cell stacks (22, 26), comprising a first cooling module (14) and a second cooling module (18). The first cooling module (14) comprises a fuel cell stack (22, 26), a supply line connection (30, 34) for connecting a supply line (38, 42) for supplying coolant to the fuel cell stack (22, 26), a discharge line connection (46, 50) for connecting a discharge line (54, 58) for discharging coolant from the fuel cell stack (22, 26), and a venting line connection (94, 98) for connecting a venting line (102, 106).

16 Claims, 4 Drawing Sheets

(56) References Cited

U.S. PATENT DOCUMENTS

2008/0160353 A1* 7/2008 Savage ............ H01M 8/04179
429/444
2010/0273079 A1* 10/2010 Hinsenkamp ..... H01M 8/04029
429/442

* cited by examiner

COOLING SYSTEM FOR FUEL CELL STACKS

CROSS-REFERENCE TO RELATED APPLICATIONS

This application is a continuation of U.S. Ser. No. 16/917,404 filed Jun. 30, 2020 and entitled "COOLING SYSTEM FOR FUEL CELL STACKS." U.S. Ser. No. 16/917,404 is a continuation of PCT Application No. PCT/IB2019/057252 filed Aug. 28, 2019 and entitled "COOLING SYSTEM FOR FUEL CELL STACKS." PCT Application No. PCT/IB2019/057252 claims priority to and the benefit of German Application No. DE 10 2018 214 640.3 filed on Aug. 29, 2018 and entitled "COOLING SYSTEM FOR FUEL CELL STACKS." The entirety of each of the foregoing applications are incorporated herein by reference for all purposes (except for any subject matter disclaimers or disavowals, and except to the extent of any conflict with the disclosure of the present application, in which case the disclosure of the present application shall control).

TECHNICAL FIELD

The present invention relates to a cooling system for fuel cell stacks and to a motor vehicle that comprises such a cooling system.

BACKGROUND

To achieve the highest possible efficiency for a fuel cell, the fuel cell must be operated at a certain, ideally constant operating temperature. This operating temperature is dependent on the type of fuel cell. If the fuel cell becomes overheated, the output of the fuel cell must be restricted. For that reason, adequate cooling during operation is critical. Moreover, when a fuel cell is started up at low temperatures, a condition referred to as a cold start, the fuel cell is able to supply only a low output since the electrochemical reaction and thus the voltage of the fuel cell are highly temperature-dependent. The temperature of the fuel cell must therefore be increased rapidly for a cold start.

Prior Art

From EP 2 287 952 B1, a temperature control device for controlling the temperature of a fuel cell stack is known.

The background of the invention is that such a cooling system for the fuel cell must be integrated into the existing systems of the vehicle. For some vehicles, this can result in substantial costs for adapting such a cooling system to the existing system in the vehicle. In addition, in most cases such adaptations are made to the detriment of the ease of maintaining the cooling system.

It is therefore the object of the present invention to specify a cooling system for fuel cell stacks, which can be integrated better and more economically into the vehicle.

DETAILED DESCRIPTION

Figure 1:
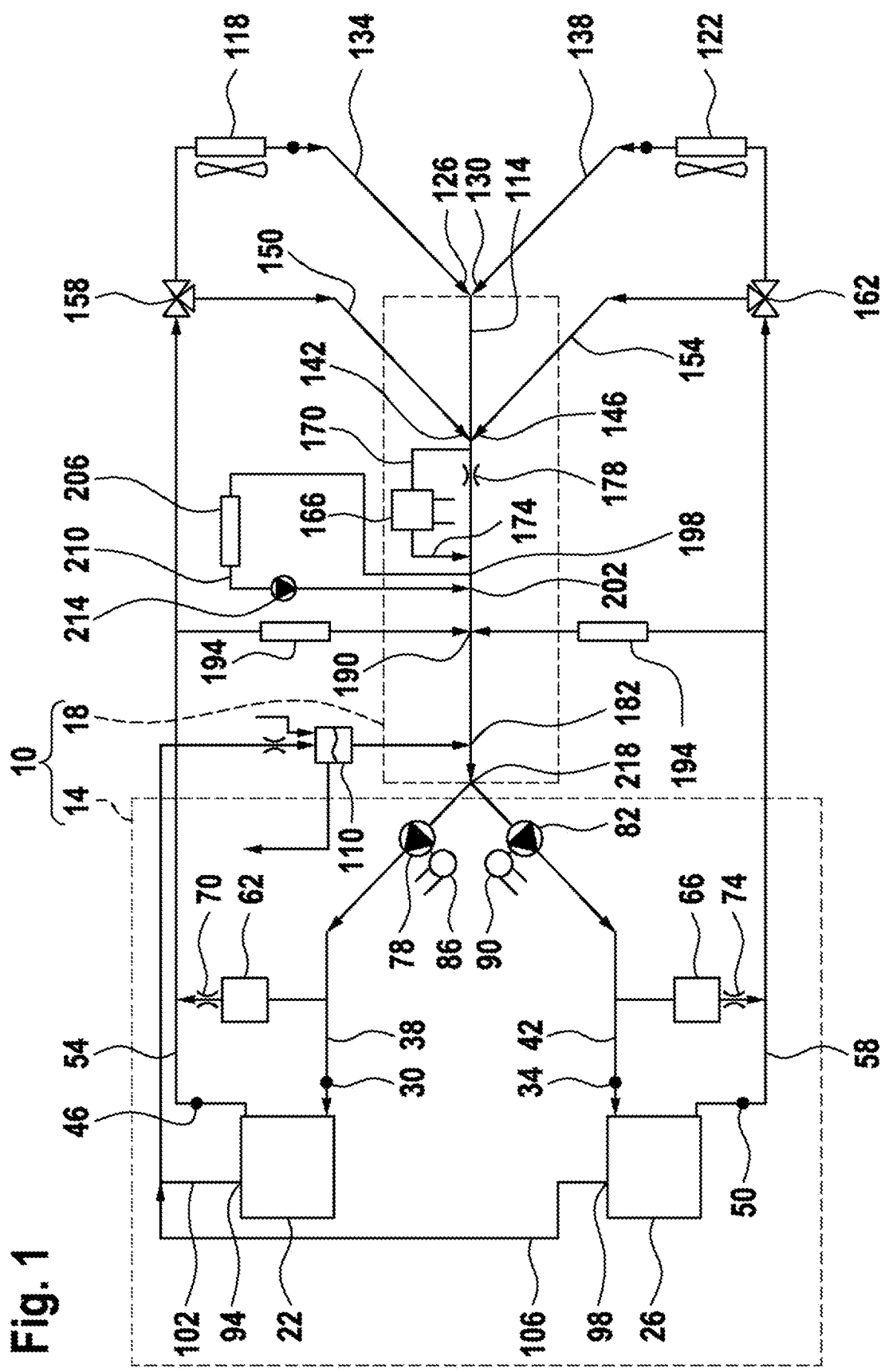
FIG. 1 illustrates a block diagram of a cooling system for fuel cell stacks according to a first exemplary embodiment of the invention.

The object is achieved by a cooling system for fuel cell stacks according to claim 1. The claims having a dependency reference thereto specify advantageous embodiments.

The cooling system comprises at least one first cooling module, which comprises a fuel cell stack having at least one fuel cell, a supply line connection for connecting a supply line for supplying coolant to the fuel cell stack, a drain line connection for connecting a drain line for removing coolant from the fuel cell stack, and a venting line connection for connecting a venting line.

The cooling system additionally comprises at least one second cooling module, which comprises at least one collection line, wherein the collection line is connected via the supply line to the supply line connection of the at least one first cooling module, at least one cooler line connection for connection to a cooler line of a cooler, via which cooled coolant of the at least one fuel cell stack can be fed to the collection line, at least one bypass line connection for connection to a bypass line, by means of which a cooling of the coolant can be bypassed, a startup heater, which is connected to the collection line via a startup heater infeed line and a startup heater discharge line, wherein the startup heater infeed line and the startup heater discharge line are arranged downstream, in the direction of flow of the collection line, of a coolant fed via the bypass line connection to the collection line, and at least one heat exchanger supply connection and at least one heat exchanger discharge connection for connecting a heat exchanger.

A connection in the context of the invention is understood as any possible connection to a line. Thus, this connection may be directly to a device such as a fuel cell stack, to a line, or to an end of a line.

A startup heater in the context of the invention is preferably an electrically operated heater, and particularly preferably is a positive temperature coefficient (PTC) heater. Electric heaters with flat heating elements may also be used. This startup heater is operated in particular during a cold start in order to bring the at least one fuel cell stack rapidly to the operating temperature. In addition, the startup heater can simultaneously contribute rapidly to a heating of the heat exchanger or the passenger compartment of the vehicle.

A collection line is understood as a line into which the coolant is conducted from various sources and is transported further. After all of the coolant has been conducted into the collection line, the coolant is conducted to the various fuel cell stacks in the various first cooling modules.

The cooler line is the line located between a cooler and the cooler line connection. The bypass line is the line via which the coolant can be conducted past the cooler without cooling. This offers the advantage that, during a cold start phase, faster heating of the fuel cell stacks is achieved by means of the hotter coolant.

Due to its modular construction, the invention additionally offers the advantages that the modules can be installed in locations that correspond to the function of the modules and are readily accessible or maintenance-friendly. Moreover, to incorporate the modules into an existing system, only a small number of connecting lines are necessary. This allows the cooling system to be integrated better and more efficiently into a vehicle.

Preferably, at least one expansion tank connection for connecting at least one expansion tank is provided on the collection line. This enables the losses resulting from temperature-induced expansion, vaporization, or evaporation to be compensated for.

Advantageously, at least one ion-exchanger connection is provided for connecting at least one ion exchanger. This allows coolant that has an ion concentration appropriate for the fuel cell stacks to be made available to the fuel cell stacks.

In a preferred embodiment of the invention, the heat exchanger is a passenger compartment heater heat exchanger. This has the advantage that the exhaust heat from the fuel cell stack can be used for heating the passenger compartment. This additionally enables the cooling output of the cooler to be reduced.

In a further preferred embodiment of the invention, the second cooling module has at least one coolant pump, by means of which the coolant can be pumped to the first cooling module. Preferably, coolant is fed via a single coolant pump to multiple first cooling modules. This saves on the number of coolant pumps. In a further preferred embodiment, for each first cooling module, a separate coolant pump is provided, by means of which coolant can be fed to each first cooling module separately. This allows only a single fuel cell stack to be operated, especially during a cold start, which rapidly reaches an operating temperature. The exhaust heat from this fuel cell stack can then be used to bring the other fuel cell stacks to the operating temperature.

Preferably, the first cooling module comprises the supply line, which is connected to the supply line connection. The supply line preferably has a coolant pump, by means of which the coolant can be pumped to the fuel cell stack. Via the coolant pump, the coolant can be fed to the fuel cell stack and then to the collection line. A closed pump circuit is thereby formed. Additionally, by actuating the coolant pump of a corresponding first cooling module, it can be regulated whether coolant flows through the cooling module. In this way, during a cold start phase, a first fuel cell stack can be heated, until additional fuel cell stacks are switched on.

Advantageously, the first cooling module comprises the drain line, which is connected to the drain line connection. In an advantageous embodiment, the first cooling module has at least one intercooler, which is arranged between the supply line and the drain line, so that a portion of the coolant can be conducted from the supply line into the drain line. By means of the intercooler, the air introduced into the fuel cell is brought into a temperature range that is required for the fuel cell. As a result, optimal operation of the fuel cell can be achieved.

In a further preferred embodiment of the invention, in addition to the intercooler, a hydrogen heat exchanger is provided, via which the hydrogen supplied to the fuel cell stack can be precooled or preheated. Said hydrogen heat exchanger can be arranged in series or in parallel to the intercooler.

In a preferred embodiment, in the startup heater infeed line, a startup heater pump is arranged, with which coolant from the collection line can be fed to the startup heater. In this way, a throttle in the collection line between startup heater infeed line and startup heater discharge line can be dispensed with. Resistance in the collection line is reduced as a result. In addition, the startup heater pump is operated only when the startup heater and/or the passenger compartment heater is/are being operated.

Particularly preferably, the heat exchanger supply connection and the heat exchanger discharge connection are arranged for a parallel or series operation of the heat exchanger in relation to the startup heater. In the case of parallel operation, the coolant is additionally conducted to the heat exchanger, so that a passenger cell can be heated, for example. In contrast, in the case of series operation, in particular when the heat exchanger is arranged downstream of the startup heater in the direction of flow, the coolant already heated by the startup heater can be supplied to the heat exchanger, so that the electric heating of the coolant enables improved heating of a passenger cell, for example.

The coolant of the at least one bypass line connection can preferably be fed to the collection line downstream of the cooler line connection in the direction of flow of the collection line. The cooling of the coolant can thereby be bypassed in an advantageous manner.

In an alternative advantageous embodiment, the coolant of the at least one bypass line connection can be fed to the collection line upstream of the cooler line connection in the direction of flow of the collection line. This embodiment has the advantage that various advantageous arrangements are possible. Particularly preferably, in this case, the startup heater infeed line is arranged upstream, in the direction of flow of the collection line, of the coolant fed via the cooler line connection to the collection line. In this way, coolant flows through the startup heater only after the coolant has been conducted via the bypass line to the collection line. Thus, coolant flows through the startup heater only after the cooler has been bypassed, in order to achieve faster heating. Faster heating can thus be assisted via the startup heater.

In an alternative embodiment, the startup heater infeed line is arranged downstream, in the direction of flow of the collection line, of the coolant fed via the cooler line connection to the collection line. This enables the temperature of the coolant conducted through the heat exchanger to be adjusted by mixing coolant fed via the cooling line connection and coolant fed via the bypass connection to the collection line.

In a further embodiment of the invention, a throttle is arranged in the collection line between the startup heater infeed line and the startup heater discharge line. Particularly preferably in this case, the startup heater discharge line is arranged downstream of the startup heater infeed line in the direction of flow of the collection line. This offers the advantage that a portion of the coolant is conducted through the startup heater. This throttle is particularly preferably arranged upstream, in the direction of flow, of the coolant fed via the cooler line connection to the collection line. In this way, a flow through the startup heater is generated when the coolant is conducted via the bypass line to the collection line. Thus, coolant flows through the startup heater only after the cooler has been bypassed, in order to achieve faster heating. The faster heating can thus be assisted via the startup heater.

In an alternative embodiment of the invention, the throttle is arranged downstream, in the direction of flow of the collection line, of the coolant fed via the cooler line connection to the collection line. A portion of the coolant introduced via the cooler line connection can thereby also be introduced into the startup heater infeed line, resulting in an improved capability for temperature control of the coolant introduced into the startup heater infeed line.

In a preferred embodiment, the startup heater discharge line has an ion exchanger connection for connecting an ion exchanger, and/or an expansion tank connection for connecting an expansion tank. This offers the advantage that the corresponding connections do not have to be provided in the collection line.

The invention additionally comprises a motor vehicle that comprises the cooling system for fuel cell stacks according to the invention. The specified advantages for the cooling system can thereby be achieved.

FIG. 1 shows a block diagram of a cooling system 10 for fuel cell stacks according to a first exemplary embodiment of the invention. The cooling system 10, in this case, comprises a first cooling module 14, bounded in the figure by a dashed line, and a second cooling module 18, bounded by a dashed line. The components not bounded by dashed lines are not part of the cooling system 10. However, these components are shown here to provide a clearer understanding of the invention.

The first cooling module 14 of the first exemplary embodiment comprises a first and a second fuel cell stack 22, 26. The first cooling module 14 additionally comprises a first supply line connection 30, assigned to the first fuel cell stack 22, and a second supply line connection 34, assigned to the second fuel cell stack 26. Connected to the supply line connections 30, 34 are a first supply line 38 assigned to the first fuel cell stack 22 and a second supply line 42 assigned to the second fuel cell stack 26, for supplying coolant to the fuel cell stacks 22, 26.

In accordance with the supply line connections 30, 34, the first cooling module 14 comprises a first drain line connection 46 for connecting a first drain line 54 for discharging coolant from the fuel cell stack 22, and a second drain line connection 50 for connecting a second drain line 58 for discharging coolant from the fuel cell stack 26. In the first cooling module 14, between the first supply line 38 and the first drain line 54, a first intercooler 62 is arranged, via which a portion of the coolant can be conducted from the first supply line 38 into the first drain line 54. This enables supply air to the first fuel cell stack 22 to be cooled. Similarly, a second intercooler 66 is arranged between the second supply line 42 and the second drain line 58. For reducing the flow through the first and second intercoolers 62, 66, a first intercooler throttle 70 and a second intercooler throttle 74 are provided.

A first coolant pump 78 is arranged in the first supply line 38, and a second coolant pump 82 is arranged in the second supply line 42, and the coolant can be pumped by means of said coolant pumps to the first and the second fuel cell stacks 22, 26, respectively. The first coolant pump 78 is driven via a first coolant pump motor 86 and the second coolant pump 82 is driven correspondingly via a second coolant pump motor 90.

The first cooling module 14 additionally comprises a first venting line connection 94 assigned to the first fuel cell stack 22 and a second venting line connection 98 assigned to the second fuel cell stack 26. A venting line 102, 106 can be connected to these connections 94, 98, so that the fuel cell stacks 22, 26 can be vented via an expansion tank 110 connected to the venting line 102, 106.

The second cooling module 18 comprises a collection line 114, in which the combined coolant of the fuel cell stacks 22, 26 is collected. The collection line 114 is connected via the supply lines 38, 42 to the supply line connections 30, 34 of the first cooling module 14. Corresponding to a first and a second cooler 118, 122, the collection line 114 has a first cooler line connection 126 for connection to a first cooler line 134 of the cooler 118, and a second cooler line connection 130 for connection to a second cooler line 138 of the cooler 122. Cooled coolant can be fed from the coolers 118, 122 via the cooler line connections 126, 130 to the collection line 114.

The collection line 114 has a first bypass line connection 142 for connection to a first bypass line 150, and a second bypass line connection 146 for connection to a second bypass line 154. By means of the bypass lines 150, 154, which in the first exemplary embodiment are connected downstream of the cooler line connections 126, 130 in the direction of flow of the collection line 114, a cooling of the coolant can be bypassed. For this purpose, 3/2-way directional control valves 158, 162 are switched accordingly, so that some or even all of the coolant can be conducted via the bypass lines 150, 154 into the collection line 114.

The second cooling module 18 additionally has a startup heater 166, configured in this exemplary embodiment as a PTC heater, which is connected to the collection line 114 via a startup heater infeed line 170 and a startup heater discharge line 174. The startup heater infeed line 170 and the startup heater discharge line 174 are arranged downstream, in the direction of flow of the collection line 114, of a coolant fed into the collection line 114 via the bypass line connections 142, 146. This allows the coolant that has bypassed the coolers 118, 122 via the bypass lines 150, 154 to be heated by means of the startup heater 166.

In the first exemplary embodiment, the startup heater infeed line 170 and the startup heater discharge line 174 are additionally arranged downstream of the cooler line connections 126, 130 and downstream of the bypass line connections 142, 146, in the direction of flow of the collection line 114. To ensure an adequate flow through the startup heater 166, a throttle 178 is arranged in the collection line 114 between the startup heater infeed line 170 and the startup heater discharge line 174. In accordance with the startup heater infeed line 170 and the startup heater discharge line 174, said throttle 178 is arranged downstream of the cooler line connections 126, 130 and the bypass line connections 142, 146.

The second cooling module 18 additionally comprises an expansion tank connection 182 to which the expansion tank 110 can be connected, and two ion exchanger connections 190 for connecting two ion exchangers 194. Between the ion exchanger connections 190 and the startup heater discharge line 174, a heat exchanger supply line connection 198 and a heat exchanger discharge connection 202 for connecting a heat exchanger 206 are connected to the collection line 114. For conducting coolant through the heat exchanger 206, a heat exchanger pump 214 is arranged in a heat exchanger discharge line 210. In the first exemplary embodiment, the heat exchanger 206 is a passenger compartment heating heat exchanger, so that warm coolant can be conducted through the passenger compartment heating heat exchanger 206. In this way, a vehicle-side passenger compartment can be heated.

At a collection line end 218 lying in the direction of flow of the collection line 114, said end is connected to the first and second supply lines 38, 42, so that the coolant can be fed to the first and second fuel cell stacks 22, 26.

In an exemplary embodiment that is not shown, the venting line connections 94, 98 of the first cooling module 14 may have throttles. However, these throttles can also be arranged outside of the first cooling module 14, for example in the venting lines 102, 106 on the vehicle side.

Figure 2:
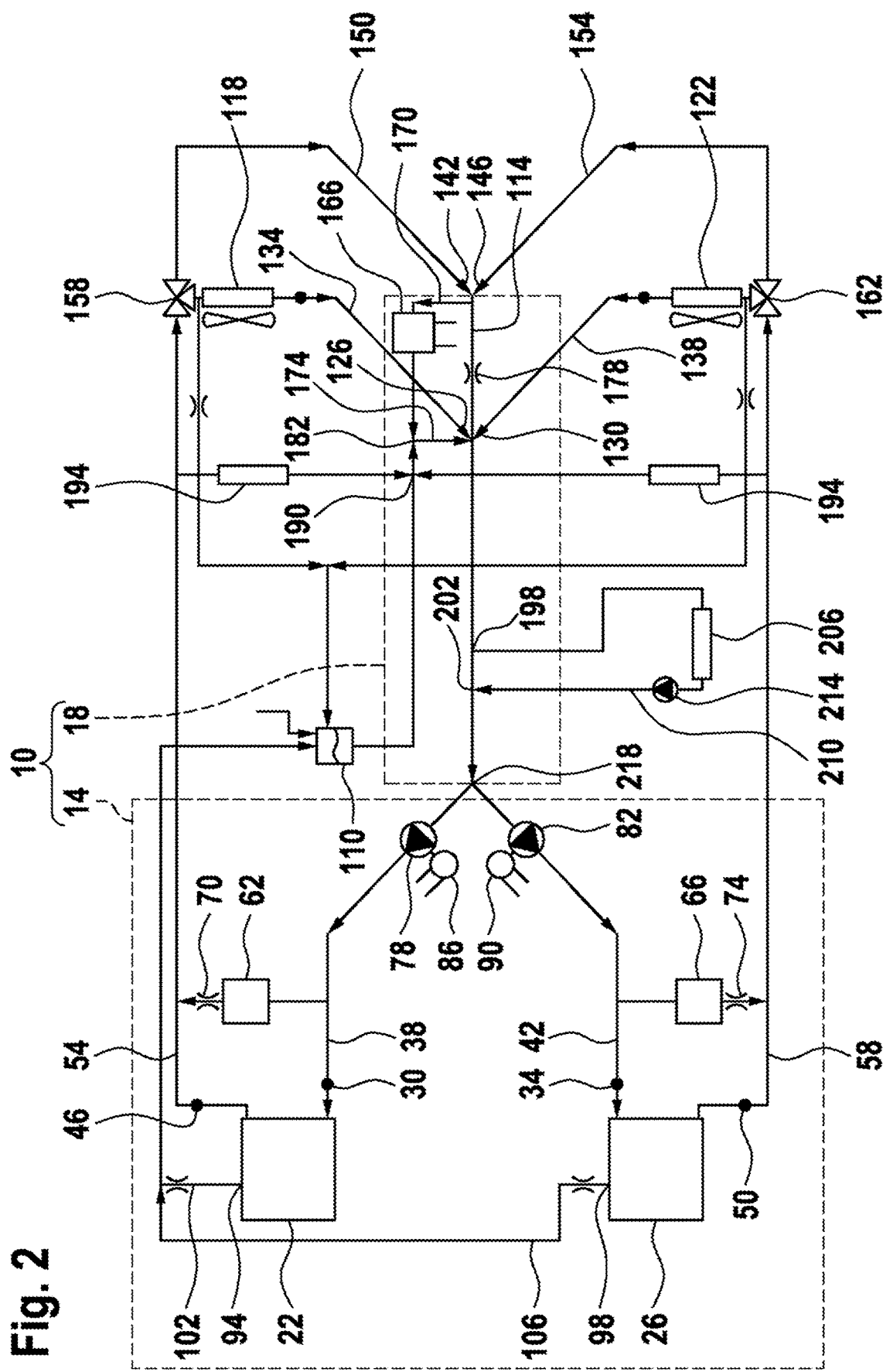
FIG. 2 illustrates a block diagram of the cooling system for fuel cell stacks according to a second exemplary embodiment of the invention.

FIG. 2 shows a block diagram of the cooling system 10 for fuel cell stacks 22, 26 according to a second exemplary embodiment of the invention. The second exemplary embodiment differs from the first exemplary embodiment essentially in that the cooler line connections 126, 130 are arranged downstream of the bypass line connections 142, 146 in the direction of flow of the collection line 114. Additionally, the startup heater infeed line 170 is connected to the collection line 114 between the cooler line connections 126, 130 and the bypass line connections 142, 146. Accordingly, the throttle 178 is arranged upstream, in the direction of flow, of the coolant fed via the cooler line connections 126, 130 to the collection line 114. Additionally, no ion exchanger connections 190 and no expansion tank connection 182 are provided in the collection line 114. Instead, the ion exchanger 194 and the expansion tank 182 are connected indirectly to the collection line 114 via the startup heater discharge line 174.

Figure 3:
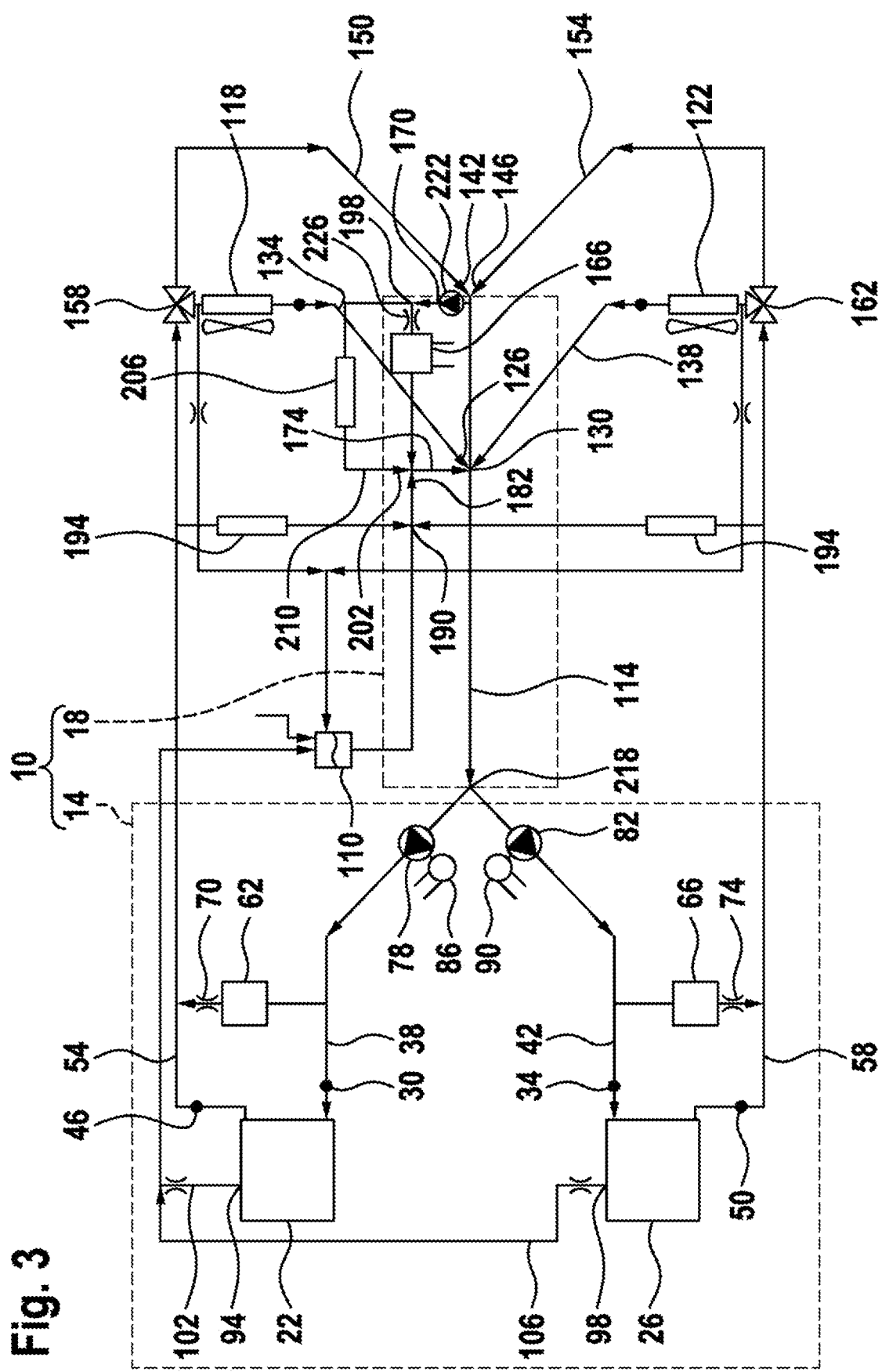
FIG. 3 illustrates a block diagram of the cooling system for fuel cell stacks according to a third exemplary embodiment of the invention.

FIG. 3 shows a block diagram of the cooling system 10 for fuel cell stacks 22, 26 according to a third exemplary embodiment of the invention. This exemplary embodiment differs from the second exemplary embodiment shown in FIG. 2 essentially in that the passenger compartment heating heat exchanger 206 is arranged parallel to the startup heater 166. Additionally, arranged in the startup heater infeed line 170 is a startup heater pump 222, with which coolant can be fed to the startup heater 166. This enables the throttle 178 in the collection line 114 to be dispensed with.

The passenger compartment heating heat exchanger 206 is connected to the startup heater infeed line 170 upstream of the startup heater 166 in the direction of flow, and is connected to the startup heater discharge line 174 downstream of the startup heater. To achieve a defined distribution of the flow volume between startup heater 166 and passenger compartment heating heat exchanger 206, a startup heater throttle 226 is arranged in the startup heater infeed line 170. The arrangement of the passenger compartment heating heat exchanger 206 in parallel with the startup heater 166 allows the heat exchanger supply connection 198 and the heat exchanger discharge connection 202 in the collection line 114 to be dispensed with.

Figure 4:
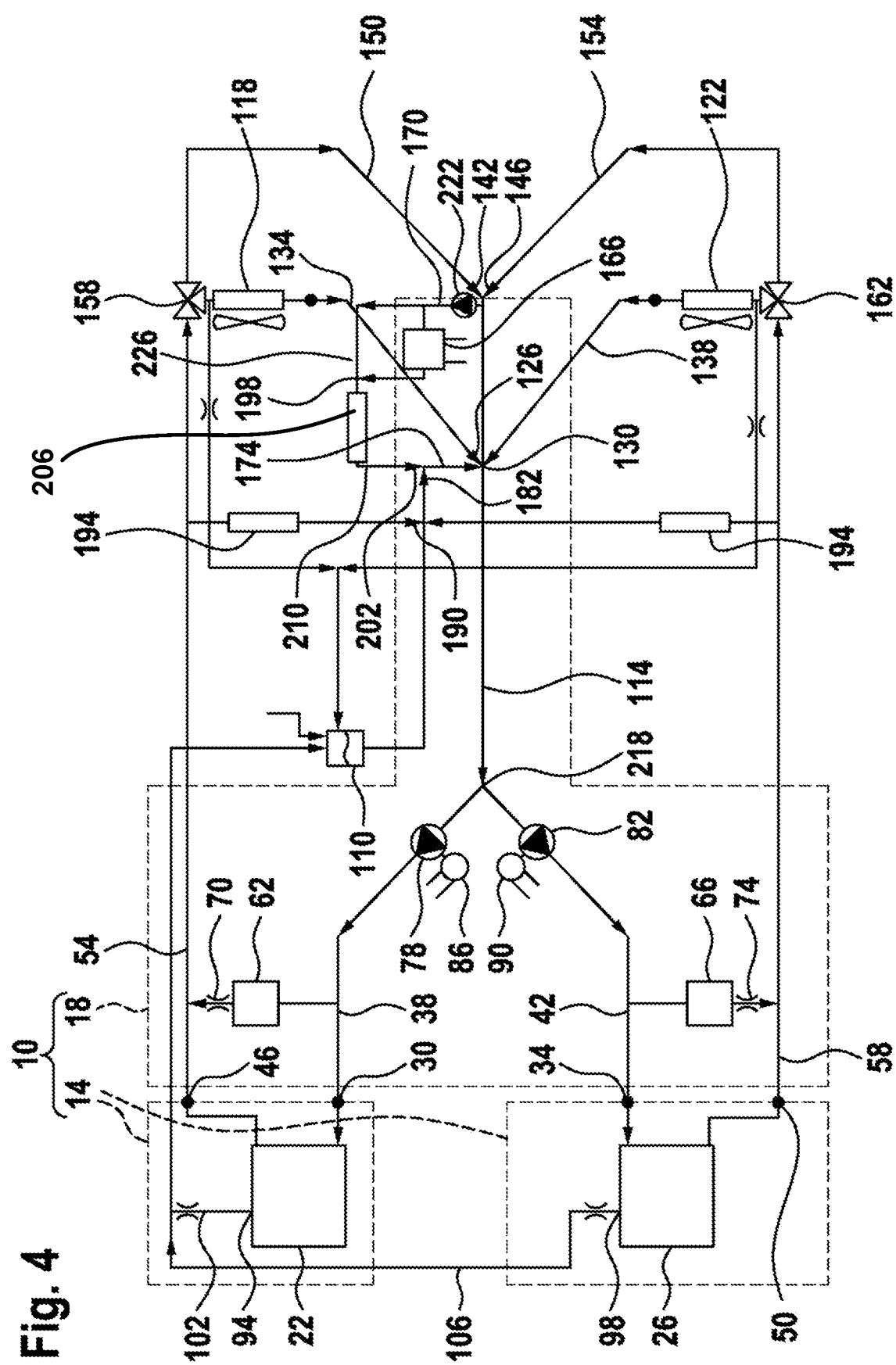
FIG. 4 illustrates a block diagram of the cooling system for fuel cell stacks according to a fourth exemplary embodiment of the invention.

FIG. 4 shows a block diagram of the cooling system 10 for fuel cell stacks 22, 26 according to a fourth exemplary embodiment of the invention. This exemplary embodiment differs from the third exemplary embodiment shown in FIG. 3 essentially in that each fuel cell stack 22, 26 is arranged in a separate first cooling module 14. However, a separate arrangement of each fuel cell stack 22, 26 in a single first cooling module 14 is also possible for all of the aforementioned exemplary embodiments.

The second cooling module 18 additionally comprises the supply lines 38, 42 and the drain lines 54, 58, which are connected respectively to the supply line connections 30, 34 and the drain line connections 46, 50 of the first cooling module 14. Accordingly, the second cooling module 18 also comprises the intercoolers 62, 66, which are arranged between the supply lines 38, 42 and the drain lines 54, 58, and the coolant pumps 78, 82 arranged in the supply lines 38, 42.

Contrary to the arrangement of the passenger compartment heating heat exchanger 206 in the third exemplary embodiment of FIG. 3, the passenger compartment heating heat exchanger 206 is connected in series to the startup heater 166. Accordingly, the passenger compartment heating heat exchanger 206 is arranged in the startup heater discharge line 174.

LIST OF REFERENCE SIGNS 10 cooling system
14 first cooling module
18 second cooling module
22 first fuel cell stack
26 second fuel cell stack
30 first supply line connection
34 second supply line connection
38 first supply line
42 second supply line
46 first drain line connection
50 second drain line connection
54 first drain line
58 second drain line
62 first intercooler
66 second intercooler
70 first intercooler throttle
74 second intercooler throttle
78 first coolant pump
82 second coolant pump
86 first coolant pump motor
90 second coolant pump motor
94 first venting line connection
98 second venting line connection
102 venting line
106 venting line
110 expansion tank
114 collection line
118 first cooler
122 second cooler
126 first cooler line connection
130 second cooler line connection
134 first cooler line
138 second cooler line
142 first bypass line connection
146 second bypass line connection
150 first bypass line
154 second bypass line
158 3/2-way directional control valve
162 3/2-way directional control valve
166 startup heater
170 startup heater infeed line
174 startup heater discharge line
178 throttle
182 expansion tank connection
190 ion exchanger connection
194 ion exchanger
198 heat exchanger supply connection
202 heat exchanger discharge connection
206 heat exchanger/passenger compartment heating heat exchanger
210 heat exchanger discharge line
214 heat exchanger pump
218 collection line end
222 startup heater pump
226 startup heater throttle

What is claimed is:
1. A cooling system for fuel cell stacks, comprising:
a first cooling module, comprising:
  a first fuel cell stack;
  a first supply line connected to the first fuel cell stack;
  a first drain line connected to the first fuel cell stack;
  a first venting line connected to the first fuel cell stack and an expansion tank;
  a second fuel cell stack;
  a second supply line connected to the second fuel cell stack;
  a second drain line connected to the second fuel cell stack; and a second venting line connected to the second fuel cell stack and the expansion tank, wherein the first fuel cell stack and the second fuel cell stack can be vented via the expansion tank;

a second cooling module, comprising:
    a collection line connected to the first supply line and the first drain line of the first cooling module, and connected to the second supply line and the second drain line of the first cooling module; and
    a startup heater connected to the collection line via a startup heater infeed line and a startup heater discharge line;

a first cooler positioned between the first drain line and the collection line;

a second cooler positioned between the second drain line and the collection line;

a first bypass connected to the collection line via a first bypass line connection; and a second bypass connected to the collection line via a second bypass line connection.

2. The cooling system of claim 1, wherein the first bypass line connection is positioned upstream of the first cooler in the direction of flow of the collection line.

3. The cooling system of claim 1, wherein the second bypass line connection is positioned downstream of the second cooler in the direction of flow of the collection line.

4. The cooling system of claim 1, wherein the startup heater discharge line comprises an ion exchanger connection for connecting an ion exchanger.

5. The cooling system of claim 1, wherein the first cooling module comprises a first intercooler positioned between the first supply line and the first drain line.

6. The cooling system of claim 1, wherein the startup heater infeed line is arranged upstream, in the direction of flow of the collection line, of coolant fed to the collection line via a first cooler line.

7. The cooling system of claim 1, wherein the first cooling module comprises a coolant pump.

8. The cooling system of claim 7, wherein the coolant pump is connected to one of the first supply line and the second supply line.

9. The cooling system of claim 1, further comprising a heat exchanger connected in parallel to the startup heater.

10. The cooling system of claim 1, further comprising a startup heater pump connected to the startup heater infeed line.

11. The cooling system of claim 10, further comprising a startup heater throttle positioned inline with and upstream of the startup heater in the direction of flow of coolant fed to the startup heater infeed line.

12. The cooling system of claim 10, further comprising a startup heater throttle positioned inline with and upstream of the heat exchanger in the direction of flow of coolant fed to the startup heater infeed line.

13. The cooling system of claim 1 further comprising a throttle positioned inline with the collection line.

14. The cooling system of claim 13, wherein the throttle is positioned upstream of a first cooler line connection, in the direction of flow of coolant fed to the collection line.

15. A cooling system for fuel cell stacks, comprising:
a first cooling module, comprising:
    a first fuel cell stack connected to a first supply line, a first drain line, and a first venting line;
    a first coolant pump connected to the first supply line;
    a first intercooler connected to the first supply line and the first drain line;
    a second fuel cell stack connected to a second supply line, a second drain line, and
    a second venting line;
    a second coolant pump connected to the second supply line; and
    a second intercooler connected to the second supply line and the second drain line;
a second cooling module, comprising:
    a collection line connected to the first supply line and the first drain line of the first cooling module and connected to the second supply line and the second drain line of the first cooling module;
    a startup heater connected to the collection line via a startup heater infeed line and a startup heater discharge line;
    a startup heater pump; and
    a startup heater throttle;
a first cooler positioned between the first drain line and the collection line;
a second cooler positioned between the second drain line and the collection line;
a first bypass connected to the collection line via a first bypass line connection;
a second bypass connected to the collection line via a second bypass line connection;
an expansion tank connected to the first venting line and the second venting line; and
a heat exchanger connected to the collection line and positioned in parallel to the startup heater of the second cooling module,
wherein the first fuel cell stack and the second fuel cell stack can be vented via the expansion tank,
wherein the startup heater pump is positioned upstream of the heat exchanger and the startup heater, and
wherein the startup heater throttle is positioned between the startup heater and the startup heater pump.

16. A cooling system for fuel cell stacks, comprising:
a first cooling module, comprising:
    a first fuel cell stack;
    a first supply line connected to the first fuel cell stack;
    a first drain line connected to the first fuel cell stack; and
    a first venting line connected to the first fuel cell stack and an expansion tank;
    a second fuel cell stack;
    a second supply line connected to the second fuel cell stack;
    a second drain line connected to the second fuel cell stack; and
    a second venting line connected to the second fuel cell stack and the expansion tank;
a second cooling module, comprising:
    a collection line connected to the first supply line and the first drain line of the first cooling module, and connected to the second supply line and the second drain line of the first cooling module;
    a startup heater connected to the collection line via a startup heater infeed line and a startup heater discharge line;
    a startup heater pump; and
    a startup heater throttle;
a first cooler positioned between the first drain line and the collection line;
a second cooler positioned between the second drain line and the collection line;
a first bypass connected to the collection line via a first bypass line connection;

a second bypass connected to the collection line via a second bypass line connection; and a heat exchanger connected to the collection line and positioned in series with the startup heater of the second cooling module, wherein the expansion tank is connected to the first venting line and the second venting line, wherein the first fuel cell stack and the second fuel cell stack can be vented via the expansion tank, wherein the startup heater pump is positioned upstream of the heat exchanger and the startup heater, and wherein the startup heater throttle is positioned between the startup heater and the startup heater pump.

\* \* \* \* \*